United States Patent

Hoyler

[15] 3,668,446
[45] June 6, 1972

[54] SEALING ARRANGEMENT FOR EDDY CURRENT APPARATUS

[72] Inventor: Alfred Hoyler, Stuttgart, Germany
[73] Assignee: Robert Bosch GmbH, Stuttgart, Germany
[22] Filed: Oct. 29, 1970
[21] Appl. No.: 85,145

[30] Foreign Application Priority Data

Nov. 3, 1969 Germany.................G 69 42 657.9

[52] U.S. Cl...........................310/90, 310/105, 308/187.1
[51] Int. Cl. ........................................................H02k 5/16
[58] Field of Search..................310/90, 92, 93, 88, 105; 308/187.1, 187.2, 36.1

[56] References Cited

UNITED STATES PATENTS

| | | | |
|---|---|---|---|
| 3,283,188 | 11/1966 | Edick | 310/105 |
| 2,991,514 | 7/1961 | Cotchett | 308/187.1 |
| 3,381,968 | 5/1968 | Neilson | 308/187.1 |
| 3,112,417 | 11/1963 | Tamm | 310/90 |
| 2,774,895 | 12/1956 | Zuckermann | 310/93 |

FOREIGN PATENTS OR APPLICATIONS 1,094,525  12/1960   Germany.......................310/90

Primary Examiner—J. D. Miller
Assistant Examiner—R. Skudy
Attorney—Michael S. Striker

[57] ABSTRACT

The hub portions of a field generating means and of an Eddy current developing means form an annular space in which a ball bearing is located. Two sealing rings are provided in the annular space on opposite sides of the ball bearing and form on one side of the same, a storage chamber filled with a lubricating grease for the ball bearing. Each sealing ring is attached to one hub portion and having parallel annular grooves. Stacks of annular metal laminations are respectively located in the grooves, and attached to the other hub portion. The laminations have lateral annular surfaces abutting each other.

8 Claims, 3 Drawing Figures

INVENTOR
ALFRED HOYLER
BY
Attorney

SEALING ARRANGEMENT FOR EDDY CURRENT APPARATUS

BACKGROUND OF THE INVENTION

The present invention is concerned with a sealing arrangement, and more particularly with a sealing arrangement for an Eddy current brake in which two coaxial hub portions form a storage chamber for a lubricating grease in which the ball bearing is located.

Eddy current brakes of this type according to the prior art have spring biassed sealing lips bounding the storage chamber which either abut the rotor hub or the rotor shaft. During rotation of the rotor at high speed, friction heat is generated which heats the adjacent bearing parts so that the radial play of the ball bearing is eliminated, resulting in destruction of the bearing.

In another arrangement of the prior art, the storage chamber for the lubricating grease is sealed by rings which have adjacent annular grooves in a cylindrical sealing surface. Sealing rings of this type are intended to produce the effect of a labyrinth seal, but are not capable of preventing the entering of dust and other foreign particles into the bearing.

SUMMARY OF THE INVENTION

It is one object of the invention to overcome the disadvantages of known sealing arrangements for Eddy current brakes, and to provide a sealing arrangement which protects the bearing from dust and other foreign particles, while developing little friction and consequent heat.

Another object of the invention is to provide sealing means between a rotary part and a stationary part which produce little friction heat.

Another object of the invention is to provide a sealing arrangement for a storage chamber containing a lubricating substance, which is constructed so that the replacement of the lubricating substance in the storage chamber can be made at long intervals, so that servicing is improved and simplified.

Another object of the invention is to provide a sealing arrangement which produces a temperature of about 80°C lower than the temperature produced in similar apparatus by sealing arrangements according to the prior art.

With these objects in view, an embodiment of the invention, applied to an Eddy current apparatus, comprises field generating first means, and Eddy current developing second means, at least one of the same being rotatable relative to the other, the first and second means having first and second annular support portions, respectively, forming an annular space; ball bearing means located in the annular space between the first and second annular support portions; and two sealing means located in the annular space on opposite sides of the ball bearing means and forming at least on one side of the same, a storage chamber adapted to contain a supply of a lubricating substance for the ball bearing means.

In accordance with the invention, each sealing means includes a sealing ring attached to one of the annular support portions and having at least one, and preferably several, annular circumferential grooves, and at least one stack of annular laminations attached to the other annular support portion and located in the annular groove.

Only low friction developed between the sealing ring and the respective stack of laminations during relative rotation of the first and second means, particularly when the sealing ring consists of a thermo insulating synthetic plastic material, and the laminations consist of thin metal sheets laterally abutting each other and provided with slits.

A sealing means including a sealing ring with grooves, and stacks of laminations located in the grooves, is not limited to the use in an Eddy current apparatus, but may be used between other rotary and stationary parts.

The novel features which are considered as characteristic for the invention are set forth in particular in the appended claims. The invention itself, however, both as to its constructions and its method of operation, together with additional objects and advantages thereof, will be best understood from the following description of specific embodiments when read in connection with the accompanying drawing.

DESCRIPTION OF THE PREFERRED EMBODIMENTS

Figure 1:
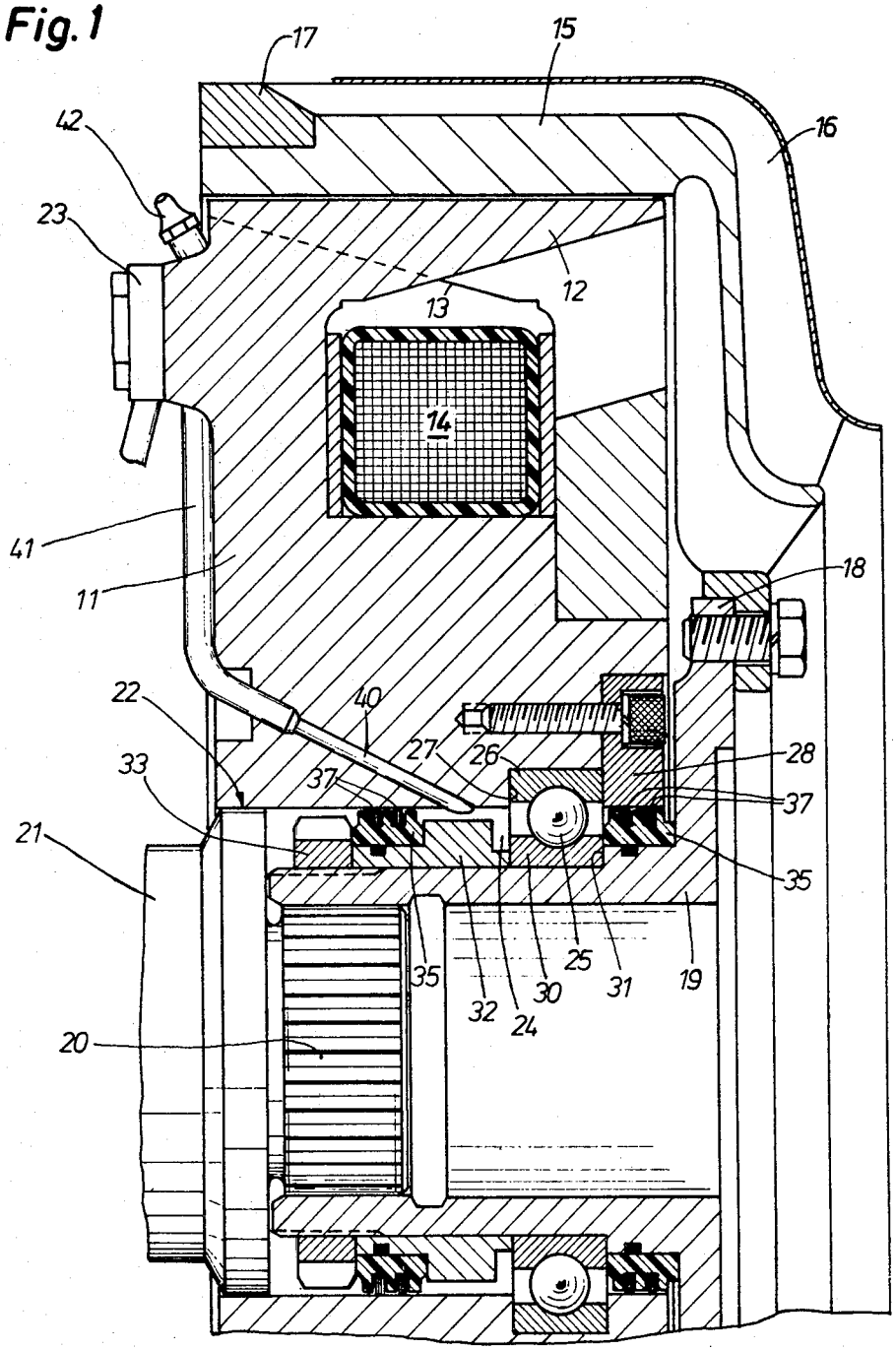
FIG. 1 is a fragmentary axial sectional view illustrating an embodiment of the invention.

Referring first to the embodiment of FIG. 1, which shows a pole wheel 11 having alternate poles 12 and 13 of alternate polarity ending in cylindrical surface portions and carrying an induction coil 14 which, when energized causes the generation of a magnetic field in the region of the poles 12 and 13. The pole wheel 11 is stationary and mounted on an annular supporting housing 22, and is further supported by annular holders 23 at the end of bracing rods.

The periphery of the pole wheel 11 is surrounded by a drum portion 15 which has cooling fins 16 and an annular reinforcing member 17, and is secured to the flange 18 of an annular supporting hub portion 19 into which a splined end portion 20 of a shaft projects. Shaft 20, which is driven from a transmission in a housing 21, rotates the hub portion 19 with the drum portion 15 so that Eddy currents develop in the drum portion 15 in a manner which is not an object of the invention. An annular space 24 is formed between the inner cylindrical surface of the pole wheel 11 and the annular hub portion 19. A ball bearing 25 is mounted in this annular space, and has an outer race 26 which is secured between the shoulder 27 of the pole wheel 11 and a ring 28 which is secured by a screw to the body of the pole wheel 11. The inner race 30 of the ball bearing 25 is clamped between a shoulder 31 of the hub portion 19 and the sleeve 32 by means of a nut 33 screwed onto a thread on the annular supporting hub portion 19.

Figure 2:
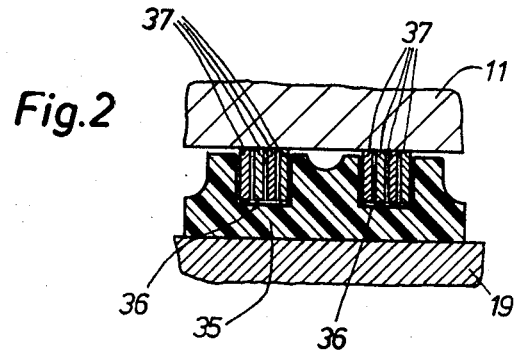
FIG. 2 is a fragmentary sectional view illustrating a sealing means according to the invention on a larger scale.

The annular space 24 between pole wheel 11 and hub portion 19 is sealed on opposite sides of ball bearing 25 by two sealing means. Each sealing means includes a sealing ring 35 with two radial outwardly open annular grooves 36, see FIG. 2, in each of which a stack of four annular laminations 37 is located with little axial and radial play. The laminations of which each stack 37 consists, are made of hardened steel, and are thin and radially slotted. The lateral planar faces of the laminations abut each other with or without play, while the outer peripheral edges of all laminations are fixedly attached to the inner surface of the inner supporting portion of the pole wheel 11, and of the holding ring 28, respectively. The sealing rings 35 are made of a synthetic material, e.g., polyamide filled with glass fibers insulating against the flow of electric and heat currents, and are fixedly attached to the hub portion 19 and to the sleeve 32, respectively. The outer diameter of the sealing rings is a little less than the inner diameter of the pole wheel 11 and of the holding ring 28. The sealing means 35, 37 form in the annular space between the pole wheel 11 and the hub portion 19, a storage chamber 24 for a lubricating substance which can be injected into the storage chamber 24 through a conduit 40 in pole wheel 11, and through a tube 41 provided with a lubricating nipple 42 secured to pole wheel 11. Preferably, a water repellent grease is placed in the annular grooves 36 before the storage chamber 24 is filled with a grease which is suitable for the ball bearing 25.

Figure 3:
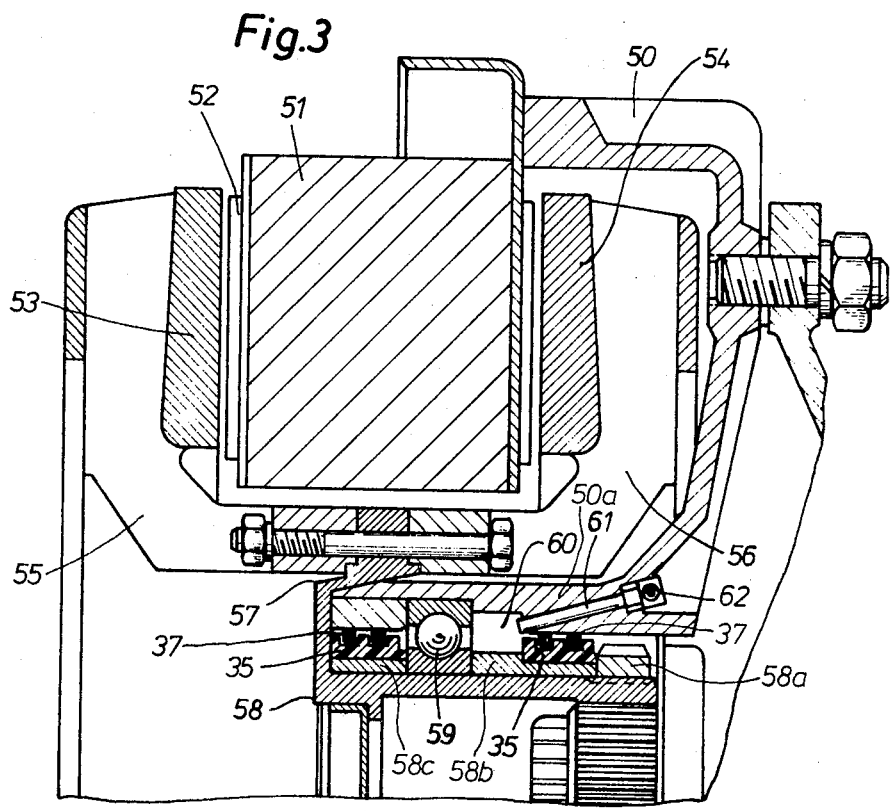
FIG. 3 is a fragmentary axial sectional view illustrating another embodiment of the invention.

In the embodiment illustrated in FIG. 3, a stationary ring 50 carries several coils 51 with cores 52 arranged at equal distances parallel to the axis of the ring 50. In front of the outer ends of cores 52, which form pole faces, annular means 53, 54 rotate, which are secured by ribs 55, 56 to the flange 57 of a hub portion 58. During rotation of the means 53, 54, Eddy currents are developed in the same due to the magnetic field generated by the coils 51 and cores 52. The stationary member 50 has a hub portion 58 to which the outer race of a ball bearing 59 is secured, while the inner race of the ball bearing abuts the sleeve 58c against which it is pressed by a nut 58a on a threaded portion of hub portion 58. Between the hub portion 50a, and the hub portion 58, an annular space is formed in which two sealing devices 35, 37 are located for forming on one side of ball bearing 59, a storage chamber for a lubricating substance by which ball bearing 59 is lubricated. A conduit 61 with a lubricating nipple 62 is provided in the inner supporting portion 50 a of member 50 so that the storage chamber 60 can be filled with the lubricating substance, when required. Each sealing means includes a sealing ring 58 with grooves 36, and stacks of laminations 37, as described in detail with reference to FIG. 2.

The storage chamber 60 is preferably filled with the ball bearing grease, while a water repellent grease is placed in the annular grooves 36 before the assembly.

Due to the fact that the sealing means 35, 36, 37 in accordance with the invention are provided on opposite sides of the ball bearings, no dust can enter the ball bearings, and due to the construction of each sealing means, the friction is low and the adjacent parts are not substantially heated during rotation of the rotary means.

It will be understood that each of the elements described above, or two or more together, may also find a useful application in other types of sealing arrangements differing from the types described above.

While the invention has been illustrated and described as embodied in sealing means including a grooved sealing ring and stacks of metal laminations located in the grooves of the sealing ring, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an Eddy current apparatus, in combination, a sealing arrangement comprising field generating first means and Eddy current developing second means, at least one of said means being rotatable relative to the other, said first and second means having first and second annular support portions, respectively, forming an annular space; ball bearing means located in said annular space between said first and second annular support portions; and two sealing means located in said annular space on opposite sides of said ball bearing means and forming at least on one side of said ball bearing means, a storage chamber adapted to contain a supply of a lubricating substance for lubricating said ball bearingmeans, and protected from dust by said sealing means, each sealing means including a sealing ring attached to one of said annular support portions and having at least one circumferential annular groove, and at least one stack of annular laminations attached to the other of said annular support portions and located in said annular groove, said laminations having planar annular lateral surfaces abutting each other.

2. Sealing arrangement as claimed in claim 1 comprising lubricating means on one of said first and second means opening into said storage chamber for supplying the lubricating substance into the same.

3. Sealing arrangement as claimed in claim 1 wherein said laminations consist of hardened steel.

4. Sealing arrangement as claimed in claim 1 wherein said laminations have slits.

5. Sealing arrangement as claimed in claim 1 wherein said sealing rings consist of a material insulating against the flow of electric and heat currents.

6. Sealing arrangement as claimed in claim 1 wherein said field generating first means is stationary, and said Eddy current developing second means is rotatable about an axis; wherein said laminations engage and are attached to said first annular support portion of said first stationary means; and wherein said sealing rings engage and are attached to said second annular support portions of said second rotatable means.

7. Sealing arrangement as claimed in claim 1 wherein each sealing ring has a plurality of parallel circumferential annular grooves; and wherein a stack of annular laminations is located in each annular groove.

8. Sealing arrangement as claimed in claim 4 comprising a water repelling grease in said annular grooves; and a ball bearing grease in said storage chamber.

* * * * *